United States Patent
Schimko et al.

(10) Patent No.: US 7,694,712 B2
(45) Date of Patent: Apr. 13, 2010

(54) WINDOW SHADE WITH COIL SPRING DRIVE

(75) Inventors: Danja Schimko, Esslingen (DE); Melf Hansen, Gondelsheim (DE); Christian Thürnau, Boll (DE)

(73) Assignee: BOS GmbH & Co. KG, Ostifildern (DE)

( * ) Notice: Subject to any disclaimer, the term of this patent is extended or adjusted under 35 U.S.C. 154(b) by 69 days.

(21) Appl. No.: 11/132,528

(22) Filed: May 19, 2005

(65) Prior Publication Data

US 2005/0257903 A1    Nov. 24, 2005

(30) Foreign Application Priority Data

May 19, 2004    (DE) .................. 10 2004 024 682

(51) Int. Cl.
*B60J 3/00*    (2006.01)

(52) U.S. Cl. .................. 160/315; 160/314; 160/370.22; 296/24.43; 296/37.16

(58) Field of Classification Search ........... 160/315, 160/314, 313, 370.22, 191, 192, 323.1; 296/97.7, 296/97.8, 37.16, 24.4, 24.43, 143
See application file for complete search history.

(56) References Cited

U.S. PATENT DOCUMENTS

| | | | | |
|---|---|---|---|---|
| 1,228,303 A | * | 5/1917 | Drumm ..................... 160/314 |
| 1,500,585 A | * | 7/1924 | Hayslett ..................... 160/301 |
| 4,139,231 A | | 2/1979 | Lang et al. |
| 4,222,601 A | * | 9/1980 | White et al. ............. 296/37.16 |
| 4,403,641 A | * | 9/1983 | Reeder ....................... 160/263 |
| 4,668,001 A | * | 5/1987 | Okumura et al. ......... 296/37.16 |
| 4,671,557 A | * | 6/1987 | Lemp ....................... 296/37.16 |
| 5,464,052 A | | 11/1995 | Wierczorek et al. |

FOREIGN PATENT DOCUMENTS

| | | |
|---|---|---|
| DE | 3631488 A1 | 5/1987 |
| DE | 69416376 T2 | 10/1999 |
| EP | 0652136 A2 | 10/1995 |
| EP | 1329349 B1 | 7/2003 |

OTHER PUBLICATIONS

European Search No. EP 05 00 9936 dated Aug. 24, 2005.

* cited by examiner

*Primary Examiner*—David Purol
(74) *Attorney, Agent, or Firm*—Leydig, Voit & Mayer, Ltd.

(57) ABSTRACT

A window shade arrangement for a motor vehicle is provided that contains a housing in which a winding shaft is rotatably supported. A strip shaped shade element is fixed on the winding shaft. The cover of the window shade housing is formed by a spring housing. A coil spring for tensioning the winding shaft in the wind up direction of the strip shaped shade is seated in the spring housing. The spring housing, the spring seated therein and a coupling shaft form a preassembled unit.

32 Claims, 8 Drawing Sheets

WINDOW SHADE WITH COIL SPRING DRIVE

FIELD OF THE INVENTION

The present invention relates to window shade arrangements for motor vehicles.

BACKGROUND OF THE INVENTION

In window shades that are commonly used in modern motor vehicles, a spring drive is used for tensioning the winding shaft of the window shade in the wind up direction of the strip shaped shade. The spring drive is formed by a helical spring that is accommodated in the interior of the winding shaft. This arrangement was predominantly utilized in the past because the winding shaft can be easily utilized as the housing for the spring drive due to its tubular shape. This was based on the notion that the spring drive can be accommodated in a space saving fashion at this location without creating major problems.

The winding shaft needs to carry out approximately 10-15 revolutions between a fully extracted position of the strip shaped shade and a completely retracted position in which the strip shaped shade is largely wound up on the winding shaft. As will be appreciated, these 10-15 revolutions of the winding shaft need to take place within the medium tensioning range of the spring drive in order to achieve a reasonable tension in both end positions. If the 10-15 revolutions were to take place at the beginning of the tensioning range of the spring drive, the tension would be too low in the wound up state. If they were to take place at the end of the tensioning range, the tension would be too high in the fully extracted position of the strip shaped shade. Consequently, the spring drive also needs to be tensioned relative to the completely relieved state of the spring drive by several revolutions, e.g., approximately 5-6 revolutions, when the strip shaped shade is completely wound up. Conversely, the spring drive requires a certain reserve, by which it could theoretically be additionally wound up, at the end of the wind up process. These requirements are associated with a specially designed spring drive in the form of a helical spring.

Another disadvantage resulting from arranging the helical spring within the winding shaft is the spring length required for achieving the above described marginal conditions. The length of the helical spring increases the risk of rattling, i.e., the spring windings hit the interior of the winding shaft because vehicle vibrations cause the helical spring to oscillate transverse to the longitudinal axis of the winding shaft. To prevent the spring windings from hitting the interior of the winding shaft, a common practice is to fill the interior of the winding shaft with a large portion of grease that serves as a damping material.

A coil spring generally has more favorable characteristics. When utilizing a coil spring, it is only necessary to maintain a certain tension at the beginning of the displacement path. The tension only increases in an abrupt manner immediately before the end of the displacement path is reached. Up to this point, the torque of a spring drive with a coil spring increases gradually in a relatively linear fashion.

Tensioning a cargo area cover for a motor vehicle with the aid of a spring drive is taught by DE 36 31 488 A1. This cargo area cover includes a housing defined by two end caps that partially surround the strip shaped cover wound on the winding shaft in a cup like fashion. The caps are provided with corresponding slots in order to extract the strip shaped cover. The wound up cover is exposed in its center region. One of the end caps contains a coil spring that is laterally adjacent the end face of the winding shaft. The inner spring end is anchored on a pin of the winding shaft. The outer spring end is fixed in a cavity of the end cap. The installation of the coil spring is relatively complicated because the cup shaped part of the spring housing is integral with the cup shaped part that represents the housing of the strip shaped cover. The DE 36 31 488 A1 reference does not provide any information as to the connection between the pin and the tubular winding shaft.

BRIEF SUMMARY OF THE INVENTION

In view of the foregoing, a general objection of the present invention is to provide a window shade arrangement for motor vehicles that has superior spring characteristics and allows the spring drive to be installed more easily.

The window shade arrangement of the invention includes a winding shaft on which one edge of the strip shaped shade is fixed, in a similar manner to the state of the art. The tensioning device comprises a coil spring for subjecting the winding shaft to tension in the wind up direction of the strip shaped shade. The coil spring is seated in a separate coil spring housing in which one end of the coil spring is anchored. The other end of the coil spring is connected to a coupling shaft. The coupling shaft is provided with a driving element for connecting the coupling shaft to a corresponding driving element for the winding shaft.

The tensioning device of the window shade arrangement of the invention can be preassembled or prefabricated due to the separate design of the spring housing. The preassembled unit can then be completed at a later time or in a different location by installing the window shade housing and the winding shaft to obtain a finished window shade unit. In addition, it is possible to combine an identical drive unit with a number of different winding shafts and/or window shade housings.

Since tolerance issues can easily arise during the attachment of the shade element to the winding shaft, the positive driving elements are subject to a certain tolerance with respect to their angular position. The utilization of positive driving elements makes it possible to reduce the ultimate deviation to a minimum during the assembly by choosing the smallest angle of rotation of the winding shaft possible during the assembly. In addition, the positively engaged driving elements only require an extremely low installation force in the axial direction when the coil spring housing is installed on the winding shaft together with the coil spring.

Depending on the respective application, the shade element of the arrangement of the present invention can consist of a sheeting or a knitted fabric, e.g., when used as a window shade. However, the shade element can also comprise a netting if the invention is used as a partition screen. The present invention could also be utilized as a cargo area cover, in which the shade element consists of an opaque sheeting.

One end of the winding shaft can have a bearing arrangement for supporting the winding shaft in a stationary fashion on the corresponding end, wherein the other bearing is formed by the spring housing and the coupling shaft. In order to generate a higher retracting force, spring housings of this type can be provided with a coil spring on both ends of the winding shaft. The above mentioned stationary bearing arrangement would be eliminated in this case. The stationary bearing arrangement may be provided in the window-shade housing or fixed in the car body.

According to one embodiment, the driving element on the winding shaft comprises a coaxial opening of non circular cross section at this location. The arrangement can be realized in a very simple fashion if the driving element is formed by an opening that is realized complementary to a flat edge section. The opening is advantageously arranged in a bushing that is rigidly seated to be stationary in the tubular winding shaft.

The coil spring may consist of a flat spiral spring or a wire spring. A wire spring has the advantage of requiring very little space in the axial direction, but is only suitable for applications, in which a low retracting force is required. A flat spiral spring is able to generate a higher retracting force, but occupies slightly more space in the axial direction.

The spring housing is preferably arranged so as to be stationary. The coil spring is anchored in the coil spring housing with its outer spring end and is connected to the coupling shaft with the inner spring end. The coil spring housing contains a bore for supporting the inserted coupling shaft. This bore simultaneously serves as a bearing for supporting the winding shaft in the radial direction.

In the assembled state, the coupling shaft cannot be axially displaced to such an extent that the connection with either the coil spring or the winding shaft is broken. However, the backward and forward movements of the winding shaft, under certain circumstances, may cause the coil spring, which is quite rigidly connected to the coupling shaft, to be pressed against a wall of the housing by the winding shaft and scrape thereon. This effect can be eliminated by supporting the coupling shaft in the coil spring housing such that the coupling shaft is separately secured in the axial direction. For this purpose, the coil spring can be provided with a peripheral annular groove, into which a tangentially extending bolt engages. This bolt can also be spring loaded in the radial direction relative to the coupling shaft such that the winding shaft is radially tensioned in one direction and any risk of rattling is eliminated. In addition, the spring loaded bolt allows an axial displacement of the coupling shaft in order to unlock a locking device, if so required.

The preassembly can be realized in a particularly simple fashion if the tensioning device consisting of the coil spring housing, the coil spring and the coupling shaft is provided with a locking device. This locking device serves for locking the spring in the wound up state. The locking of the spring can take place at the preassembly plant or location and prevents installation errors during the subsequent installation. This means that, during installation work, winding up the coil spring to the required tension is no longer necessary.

The locking device can simply comprise a pin that extends into the coupling shaft through an opening and is anchored in the coil spring housing. After the installation of the winding shaft, the pin is pulled out such that the force of the coil spring is released and acts upon the winding shaft.

Another option comprises providing the coupling shaft with a profile that is complementary to a correspondingly profiled opening in the coil spring housing. After being assembled with the winding shaft and the window shade housing, the coupling shaft is axially displaced such that it is released from the profiled opening in the coil spring housing and is then freely rotatable.

The coil spring housing may simply consist of a cup with a cover. The bore for supporting the coupling shaft is arranged in the bottom of the cup shaped part.

The description of the figures makes it clear that numerous modifications are possible. These modifications do not have to be described in greater detail and depend on the respective marginal conditions that are defined by the installation position and other circumstances.

BRIEF DESCRIPTION OF THE SEVERAL VIEWS OF THE DRAWING(S)

DETAILED DESCRIPTION OF THE INVENTION

Figure 1:
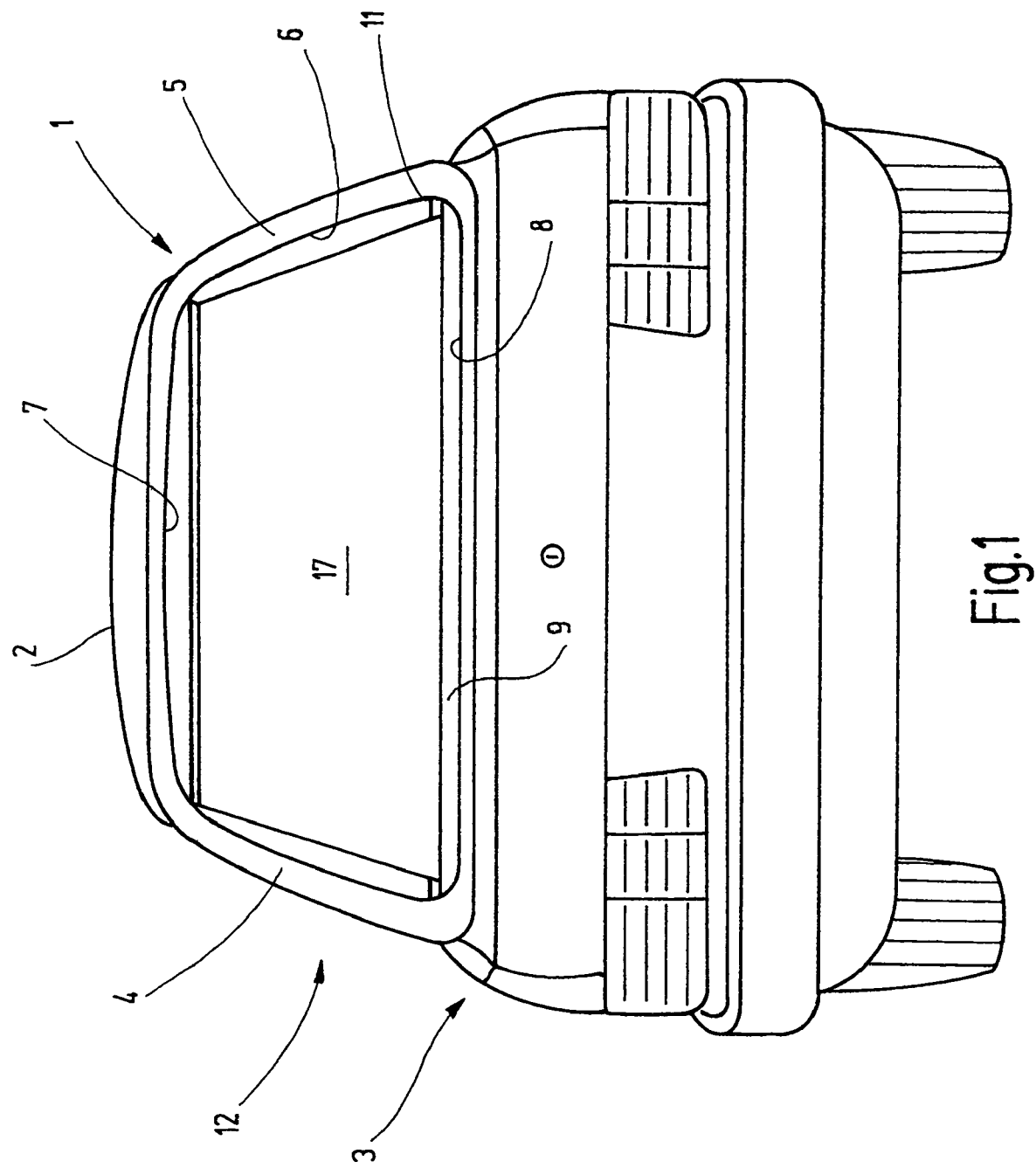
FIG. 1 is a rear view of an illustrative vehicle including an exemplary window shade arrangement according to the invention configured in the form of a rear window shade.

FIG. 1 provides a schematic rear view of a motor car 1 with a roof 2, a trunk 3 and two C columns 4 and 5. A rear window opening 6 is situated between the two C columns 4 and 5. The rear window opening 6 is limited by a rear roof edge on the upper side and by a window parapet 8 on the lower side. A rear window is conventionally mounted in the rear window opening 6.

Figure 2:
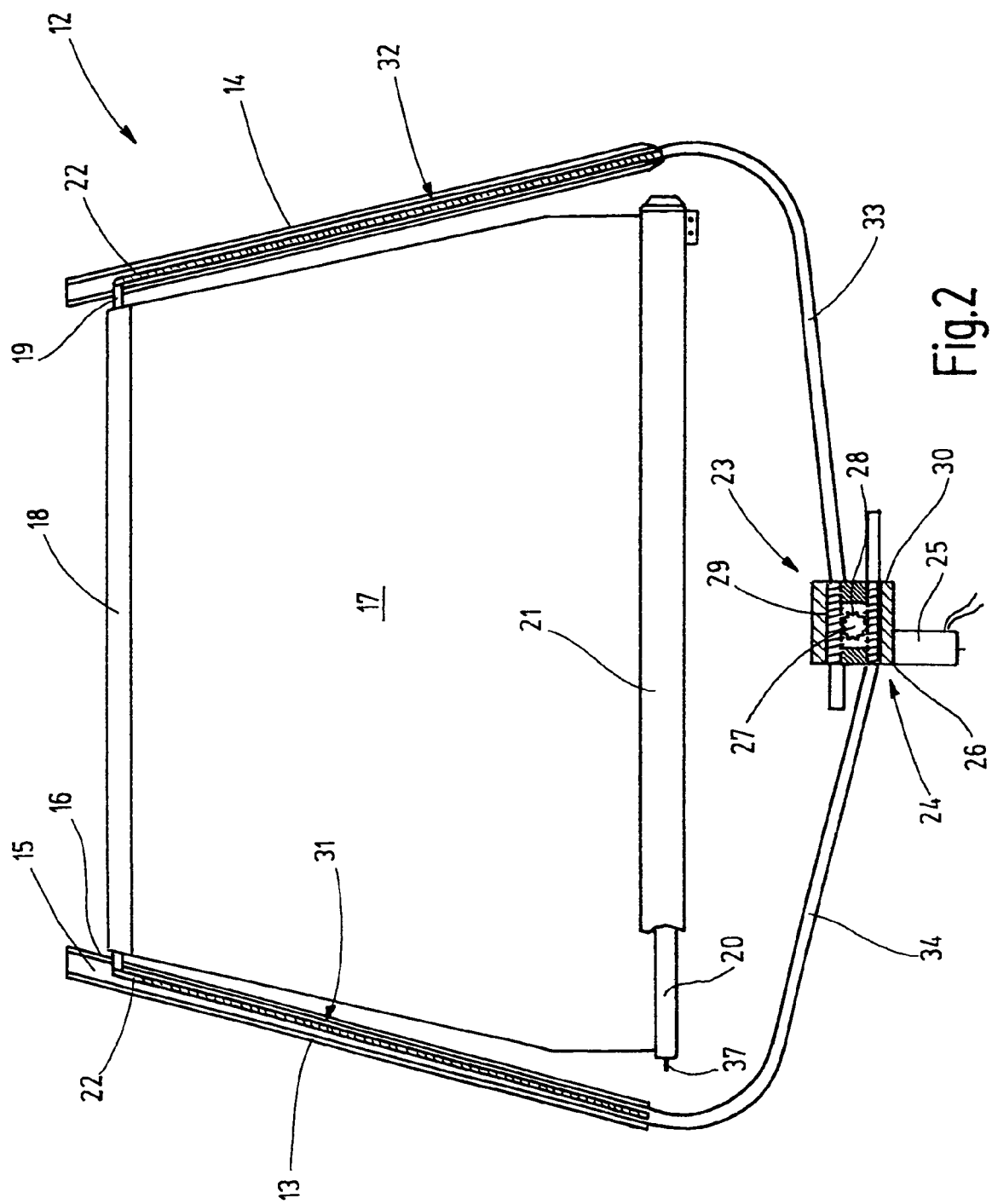
FIG. 2 is a schematic front view of the rear window shade arrangement of FIG. 1.
Figure 3:
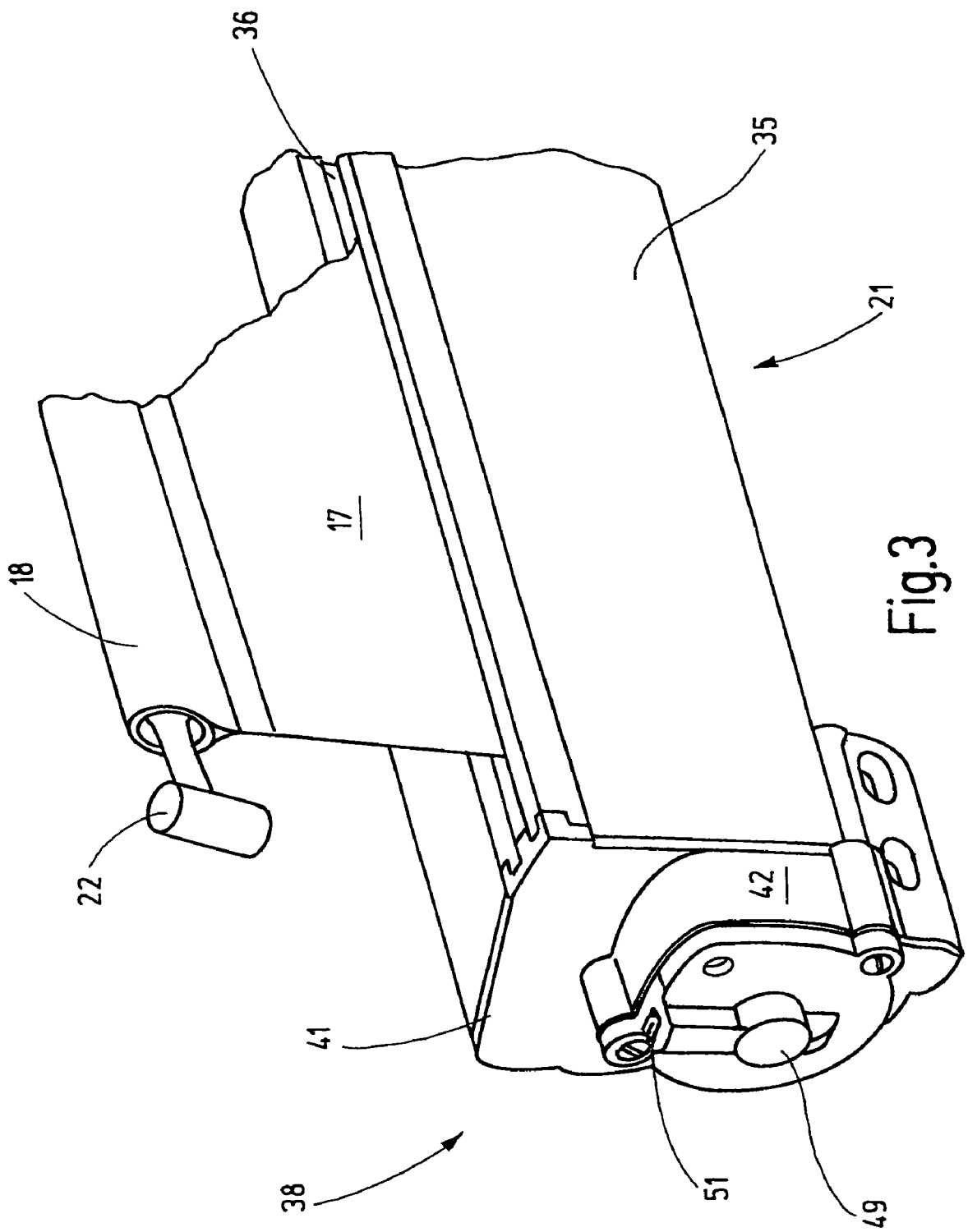
FIG. 3 is a partial, perspective section view of the housing of the window shade arrangement of FIG. 1.
Figure 4:
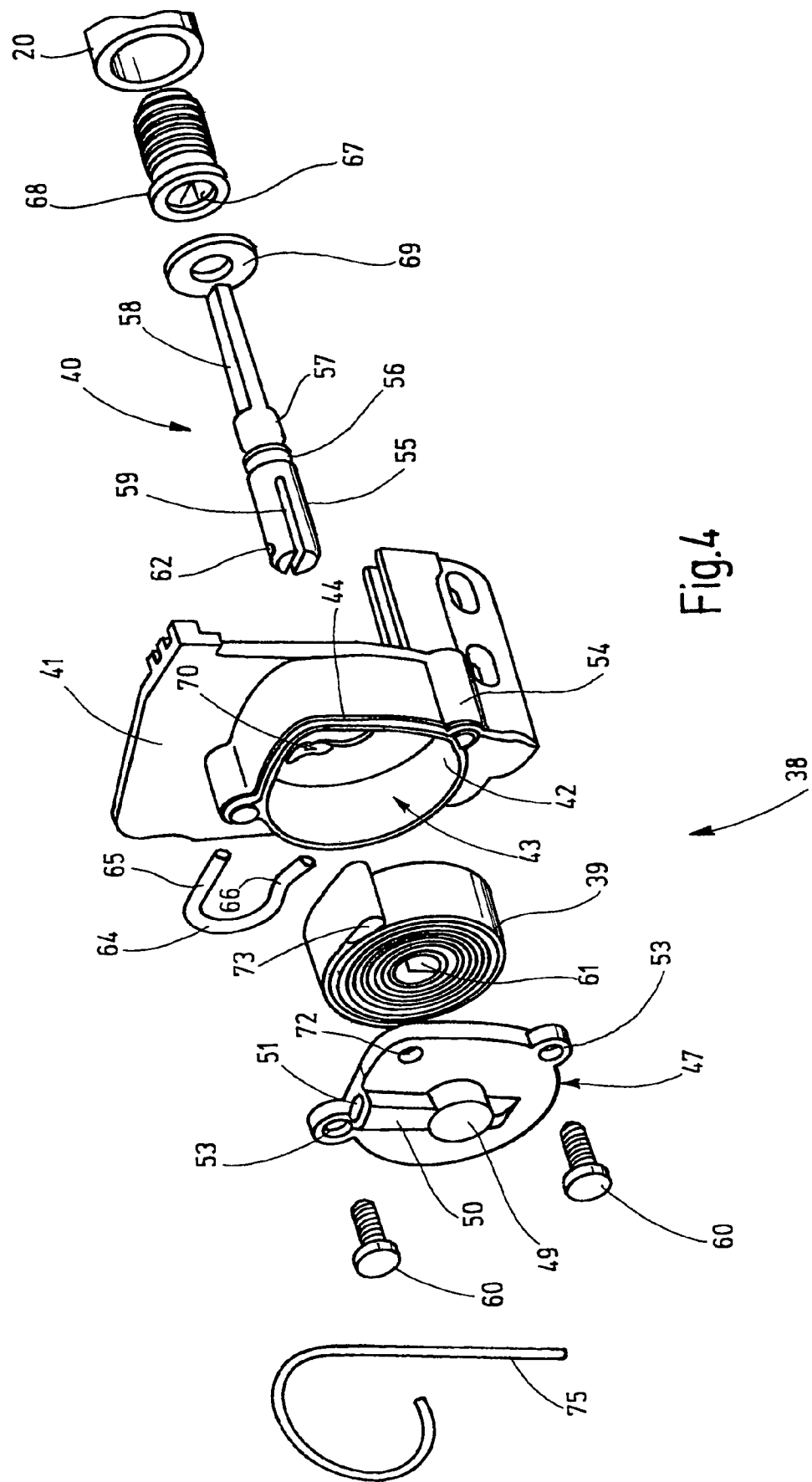
FIG. 4 is an exploded perspective view of the tensioning device of the window shade arrangement of FIG. 1.

In the interior of the motor car 1, a rear window shelf 9 is situated underneath the rear window. The rear window shelf 9 extends horizontally between the lower window edge 8 and a rear seat back rest that is not shown in FIG. 1. The rear window shelf 9 has a straight extraction slot 11. The extraction slot 11 relates to a rear window shade 12 that is shown in FIG. 2.

The rear window shade 12 includes two guide rails 13 and 14 that are sunk into the C columns 4 and 5 adjacent to the window edges. The guide rails respectively contain a guide groove 15 that opens in the direction of the respectively opposite guide rail 13 or 14 in the form of a slot 16. The rear window shade 12 also includes a strip shaped shade element 17, one edge 18 of which is shaped into a tubular pocket for accommodating an extraction profile or pull bar 19. The rear window shade 12 also includes a winding shaft 20 that is rotatably supported in a housing 21 underneath the extraction slot 11 in the rear window shelf 9. An edge of the strip shaped shade 17 that extends parallel to the edge 18 is fixed on the winding shaft 20.

The pull bar 19 has a telescopic-like configuration and consequently can be axially extended and shortened. The outer ends of the pull bar 19 carry guide elements 22 that are guided in a longitudinally displaceable fashion in the grooves 15. A tapered neck section of the guide profile 19 protrudes through the slots 16 that are widened adjacent thereto such that the guide elements 22 cannot be pulled out through the longitudinally extending slots 16.

The strip shaped shade 17 is extracted by means of a drive unit 23 that comprises a gear motor 24 with a permanent field d.c. motor 25 as well as a transmission 26. A pinion gear 28 is seated in a rotationally rigid fashion on an output shaft 27. Two bores 29 and 30 that serve as guides for flexible thrust elements 31 and 32 extend tangentially past the pinion gear 28. The thrust elements consist of so-called Suflex shafts that are composed of a core with a circular cross section that carries a helically extending rib on its outer circumferential surface. Accordingly, the thrust elements 31 and 32 resemble helically geared racks, wherein the gearing extends, however, over the entire circumference. The pitch of this gearing is adapted to that of the gearing of the pinion gear 28. It is ensured that the thrust elements 31 and 32 positively mesh with the pinion gear 28. The bores 29 and 28 extend on diametrically opposite sides such that the thrust elements 31 and 32 meshing with the pinion gear 28 are displaced in opposite directions when the pinion gear 28 is set in rotation.

The two thrust elements 31 and 32 respectively extend from the pinion gear 28 to the lower end of the corresponding guide rails 13 and 14 and are guided by guide tubes 33 and 34 in this section. The guide tubes 33 and 34 serve for guiding the thrust elements 31 and 32 in a buckle proof fashion such that the thrust can be reliably transmitted. The ends of the thrust elements act upon the guide elements 22.

The window shade housing 21 includes a tubular center section 35 that accommodates the winding shaft 20. The center section 35 includes a slot 36 that continuously extends in the longitudinal direction and serves as an outlet slot, through which the strip shaped shade 17 extends out of the housing 21. The tubular center section 35 is closed at the discontinued end with a cover. The cover includes a bore for supporting a journal 37 of the winding shaft 20. A coil spring housing 38 is mounted on the opposite end of the tubular center section 35. The coil spring housing 38 accommodates a coil spring 39 that is positively coupled to the winding shaft 20 by means of a coupling shaft 40 that protrudes from the coil spring housing 38.

The coil spring housing 38 comprises an essentially planar base plate 41. One flat side of the base plate 41 faces the center section 35 and the other flat side of the base plate carries a closed side wall 42 integrally formed thereon. The side wall 42 together with the defined region of the base plate 41 defines a cup shaped interior 43 in which the coil spring 39 is accommodated. A bore 44 for supporting the inserted coupling shaft 40 is arranged in the base plate 41 coaxial to the housing wall 42. The bore 44 extends through a mesa shaped reinforcing region 45 on the side of the base plate 41 that faces the tubular center section 35. In addition, the side of the base plate 41 that faces the tubular center section 35 is provided with a series of ribs 46 for radially fixing the center section 35 and preventing the slot 36 from widening.

The interior 43 is closed with a cover 47, the outside contour of which follows the outside contour of the housing wall 42. The cover 47 includes a blind bore 48 that is aligned with the bore 44. A dome 49 is created on the outer side of the thin walled cover 47 due to the blind bore 48. A rib 50 extends into the dome from the top. A bore 51 extending through the rib 50 continues as far as a blind bore 52 provided on the other side of the blind bore 48. The cover 47 is also provided with two laterally protruding extensions 53 that are aligned with bead like ribs 54 on the outside of the housing side wall 42. The extensions 53 as well as the bead like ribs 54 have bores designed for receiving mounting screws 60 in order to screw the cover 47 to the face of the housing wall 42 that lies opposite the base plate 41.

The coupling shaft 40 is composed of a cylindrical section 55, the diameter of which corresponds to the diameter of the bore 44, an adjacent annular groove 56, a cylindrical section 57 and an oblong flat edge section 58. The length of the cylindrical section 55 is selected such that the cylindrical section is not only supported in a rotatable fashion in the bore 44, but also in the blind bore 48. The cylindrical section 55 of the coupling shaft 40 is supported on both ends in this fashion. The cylindrical section 55 also has a longitudinally extending slot 59, in which an angled end 61 of the inner spring winding of the coil spring 39 is secured. A transverse bore 62 that is aligned with the bore 51 in the installed cover 47 in one rotational position also extends through the section 55.

Figure 5:
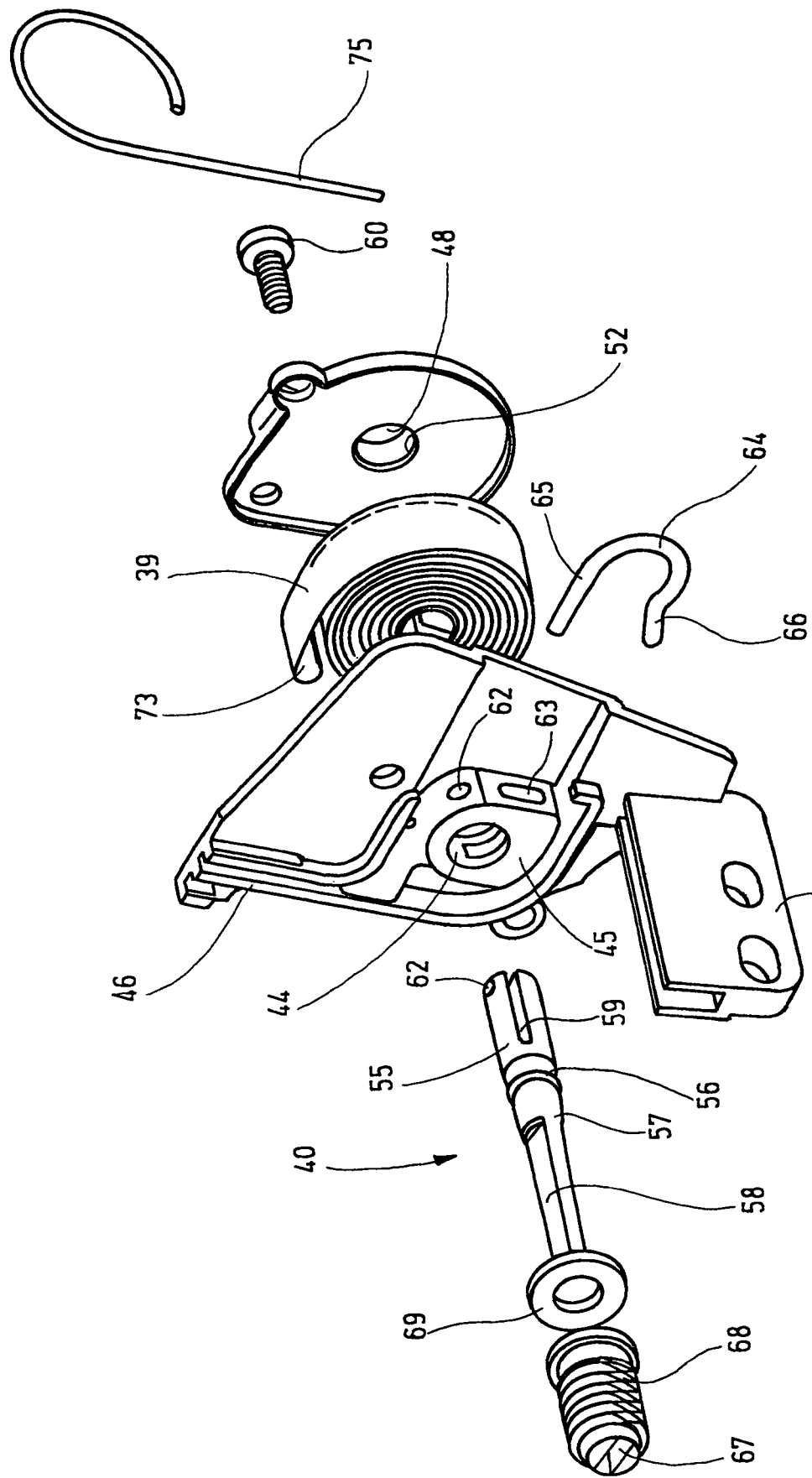
FIG. 5 is an exploded perspective view of the tensioning device of the window shade arrangement of FIG. 1 viewed from the direction of the window shade housing.

The annular groove 56 is provided in order to fix the coupling shaft 40 in the axial direction and prevent creeping thereof. In the assembled state, the annular groove 56 is situated within the height of the reinforcing region 45. As shown in FIG. 5, this reinforcing region is provided with two additional bores or openings 62 and 63. The bores 62 and 63 extend tangential to the longitudinal axis of the bore 44 and laterally cut into said bore. The bores 62 and 63 serve for receiving a U-shaped spring clip 64 that can be inserted into the bores or openings 62 and 63. The spring clip 64 has a straight leg 65 and an angled or slightly bent leg 66. Accordingly, the bore 62 for receiving the leg 65 is straight and circular while the opening 63 has a cross section in the form of an oblong hole as shown. Both bores 62 and 63 extend beyond the bore 44. The two legs 65 and 66 are designed such that, when inserting the spring clip 64, the bent leg 66 is pressed downward in order to pass the thickest point of the coupling shaft 40 viewed in the direction of this leg. After the installation, the straight leg 65 and a corresponding region of the leg 66 are situated within the annular groove 46 that has a correspondingly adapted cross section.

The flat edge section 58 serves as a positive driving element. A correspondingly contoured opening 67 is configured complementary to this driving element and is arranged in a bushing 68 that is rigidly seated so as to be stationary in the tubular winding shaft 20. In order to lower the friction between the face of the bushing 68 and the face of the reinforcing region 45, it is possible to insert a friction reducing thrust washer 69 (made, e.g, of Teflon) that is seated on the coupling shaft 40.

The reaction power of the coil spring 39 is absorbed by a pin 71 that originates at the base plate 41 and protrudes in the direction of the cover 47 within the cup shaped interior 43. In the closed state, the pin 71 protrudes into a corresponding bore 72 of the cover 47. The inwardly folded outer spring end 73 is secured on the pin 71.

As will be apparent to those skilled in the art, the coil spring housing 38 represents an independent preassembled unit. The assembly is carried out as follows: Initially, the coil spring 39 is inserted into the open cup shaped interior 43. During this process, the inwardly folded outer spring end 73 is anchored on the pin 71. The angled inner spring end 61 is situated in front of the bore 44. The coupling shaft 40 is then inserted through the bore 44, particularly in such a way that the angled inner spring end 61 is positioned in the slot 59.

The coupling shaft 40 is inserted into the bore 44 until the annular groove 56 is aligned with the two tangential bores 62 and 63. The U shaped spring clip 64 is then inserted into these tangential bores in the direction shown in FIG. 5, namely until the angled leg 66 engages behind the coupling shaft 40. This means that the coupling shaft 40 is fixed in the axial direction and anchored on the coil spring 39, which is configured in the form of a leaf spring. During subsequent attachment of the cover 47, the end of the section 55 of the coupling shaft 40 that protrudes over the flank of the coil spring 39 penetrates into the bore 48. Consequently, the section 55 is supported in bores on both sides of the coil spring 39.

In the next step, the coupling shaft 40 is turned in the wind up direction of the coil spring 39 by means of an appropriate device, for example, a hand crank. After a predetermined number of revolutions, the next position is located in which the bore 62 is aligned with the bore 51. After this position is reached, a wire shaped securing pin 75 is inserted, wherein the upper end of this securing pin is bent in a semicircular shape and functions as a handle. The securing pin 75 extends into the blind bore 52 through the bore 51 and the bore 62. The force for turning the coupling shaft 40 in the wind up direction of the coil spring 39 is now no longer required. The securing pin 75 cannot fall out because the torque generated by the coil spring 39 causes the securing pin 45 to be frictionally locked in the above mentioned bores. The spring housing 38 is now completely assembled and can be stored or delivered to the assembly line in the form of an independent unit that is already pre-tensioned.

In order to complete the window shade, the tubular winding shaft 20 is initially provided with the corresponding driving element by pressing in the bushing 68. The strip shaped shade 17 is then fixed on the winding shaft 20 and wound up on the winding shaft 20. The resulting unit is then inserted into the center section 35 from one end. The corresponding cover is threaded on the journal 37 and fixed on the center piece 35.

As soon as this stage is reached, the preassembled spring housing 38 is joined to the center section 35 with the coupling shaft pointing forward. During this process, the long flat edge section 58 penetrates into the complementary opening 67 of the winding shaft 20. This causes a positive, axially displaceable connection to be produced between the coupling shaft 40 and the winding shaft 20. Subsequently, the coil spring housing 38 is screwed to the center section 35 by means of screws. These screws are not illustrated in the figures because the position of these screws is dependent on the marginal conditions and the screws and their position are not important for comprehending the invention. The securing pin 75 can be pulled out after the coil spring housing 38 is fixed on the center section 35. The force of the wound up coil spring 39 now directly acts upon the winding shaft 20 via the coupling shaft 40.

An extraction of the strip shaped shade element 17 causes the coil spring 39 to be additionally wound up. The most relieved state occurs during the assembly stage, when the strip shaped shade element 17 is completely wound up. The interior 43 that accommodates the coil spring 39 is largely closed. A grease filling introduced into this interior in order to reduce noise cannot ooze out.

The anchoring of the outer spring end on the pin 71 is able to absorb significant forces because the pin 71, although made of plastic, is not only anchored on the side of the base plate 41, but also in the bore 72 provided in the cover 47 on the other side.

Figure 6:
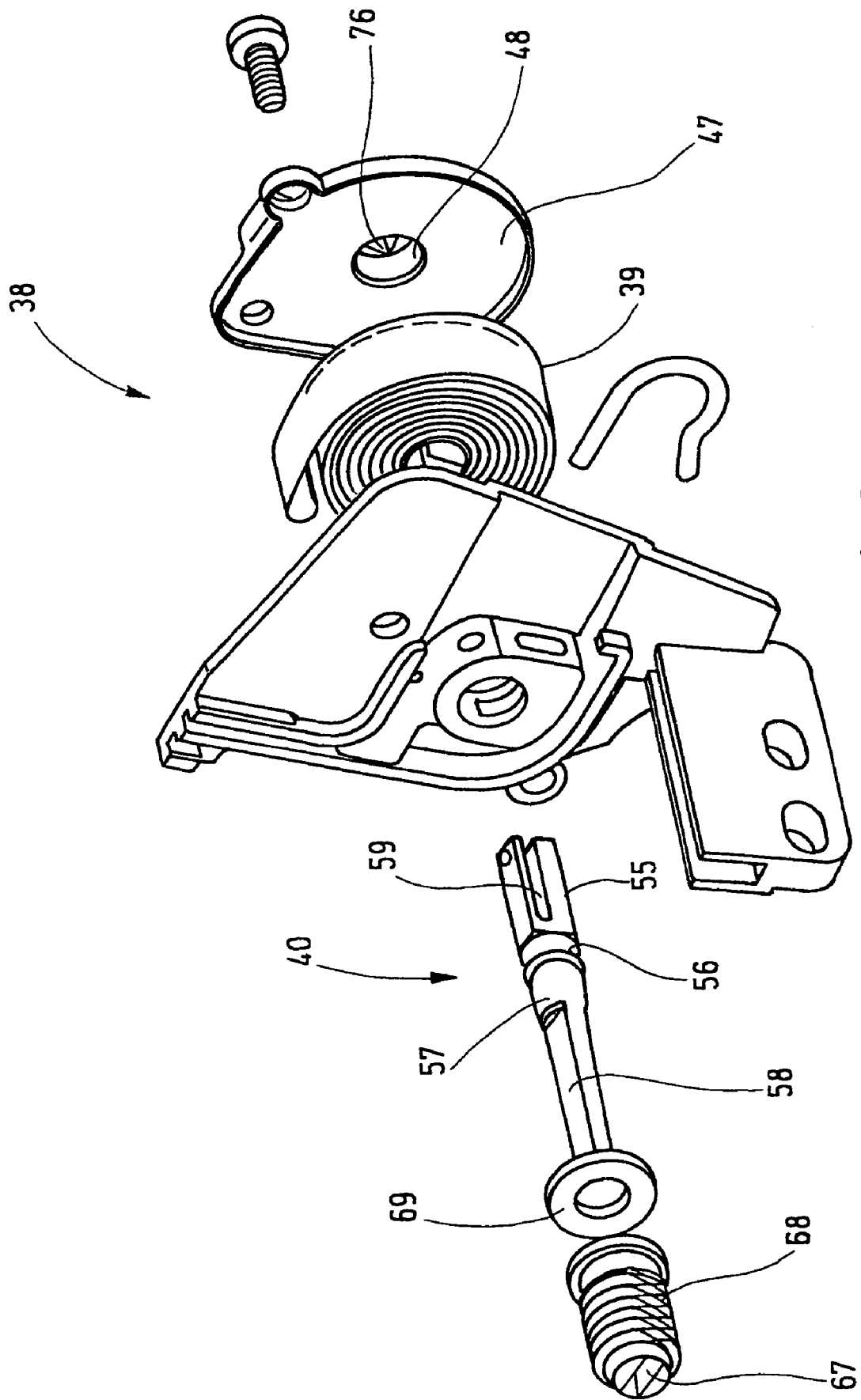
FIG. 6 is an exploded perspective view of an alternative embodiment of a tensioning device for a window shade arrangement according to the invention with a modified locking mechanism.
Figure 7:
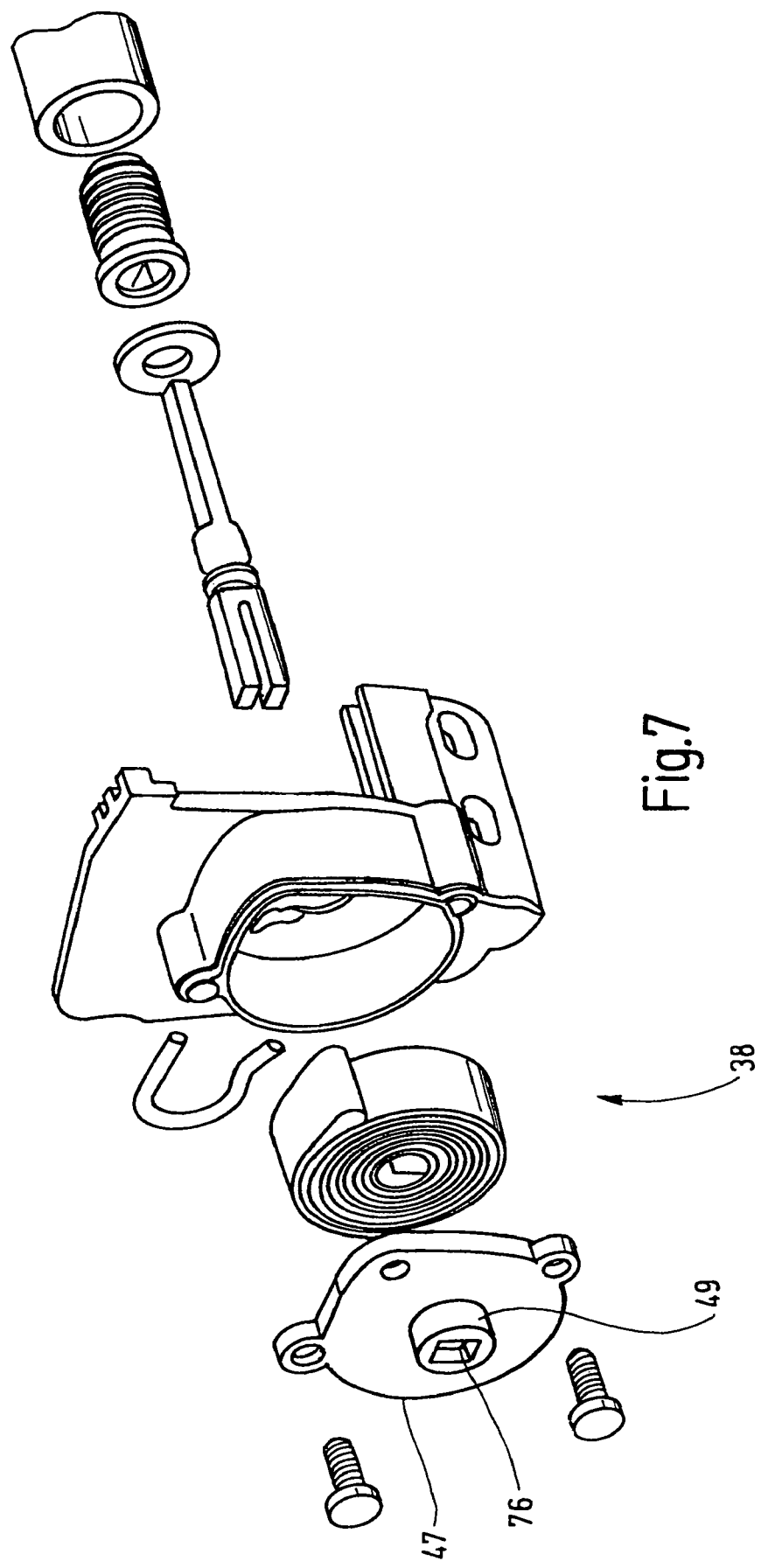
FIG. 7 is an exploded perspective view of the tensioning device of FIG. 7.

FIGS. 6 and 7 illustrate another embodiment that differs from the embodiment of FIGS. 1-5 only with respect to the locking mechanism. In the embodiment of FIGS. 1-5, a securing pin 75 is used for locking the wound up coil spring 39. In the embodiment of FIGS. 6 and 7, the section 55 has a square cross section. A bore that is cylindrical in the inner region and extends outward via a square opening 76 is used instead of the blind bore 48. The cross section of the square opening 76 is adapted to the cross section of the square section 55. The diagonal diameter of the square opening 76 corresponds to the diameter of the cylindrical section such that the section 55 is positively anchored in the square opening 76, but freely rotatable in the cylindrical part of the bore 48.

The assembly differs slightly from the embodiment of FIGS. 1-5. After installing the coil spring 39, the coupling shaft 40 is inserted. Subsequently, the coupling shaft that initially is freely rotatable in the cylindrical section 48 is wound up as described above until the desired tension is reached. The coupling shaft 40 is then additionally displaced in the direction of the square opening 76 until the section 55 penetrates into the opening 76. This means that the coupling shaft 40 is locked and prevented from turning. The securing clip 64 situated outside the groove 56 on the cylindrical part 57 can now be inserted.

After the assembly with the winding shaft is completed, the coupling shaft 40 is pressed out of the opening 76 with the aid of a corresponding tool until the spring clip 64 engages into the groove 56. During this process, the section 55 is released from the square opening and is able to turn freely in the cylindrical section 48 as described above. The advantage is in the elimination of an additional securing pin. As will be appreciated, the coupling shaft 40 does not have a sharp edged profile in the region of the section 55 as shown, but rather a profile with rounded corners. Such an illustration would be unnecessarily complicated and is not required for an understanding of the invention.

The embodiments of FIGS. 1-7 are specifically directed to a rear window shade. As will be understood by those skilled in the art, the present invention could be incorporated into a side window shade instead of a rear window shade. In addition, those skilled in the art will readily comprehend that the coil spring housing 38 does not necessarily have to form part of a complete window shade housing. On the contrary, the described coil spring housing 38 may also be independently mounted in the car body, for example, underneath the rear window shelf or at another suitable location.

Those skilled in the art will also appreciate that a coil spring housing 38 of the type shown can be arranged on both sides of the winding shaft 20 in order to increase the retracting force. This arrangement, in particular, provides the advantage that the winding shaft does not have to be arranged asymmetrically due to the axial length of the coil spring 39, but can be installed symmetrically. A partition screen and a cargo area cover (see FIG. 8) are further window shade like structures capable of being tensioned with the aid of a spring housing 38 as described above.

Figure 8:
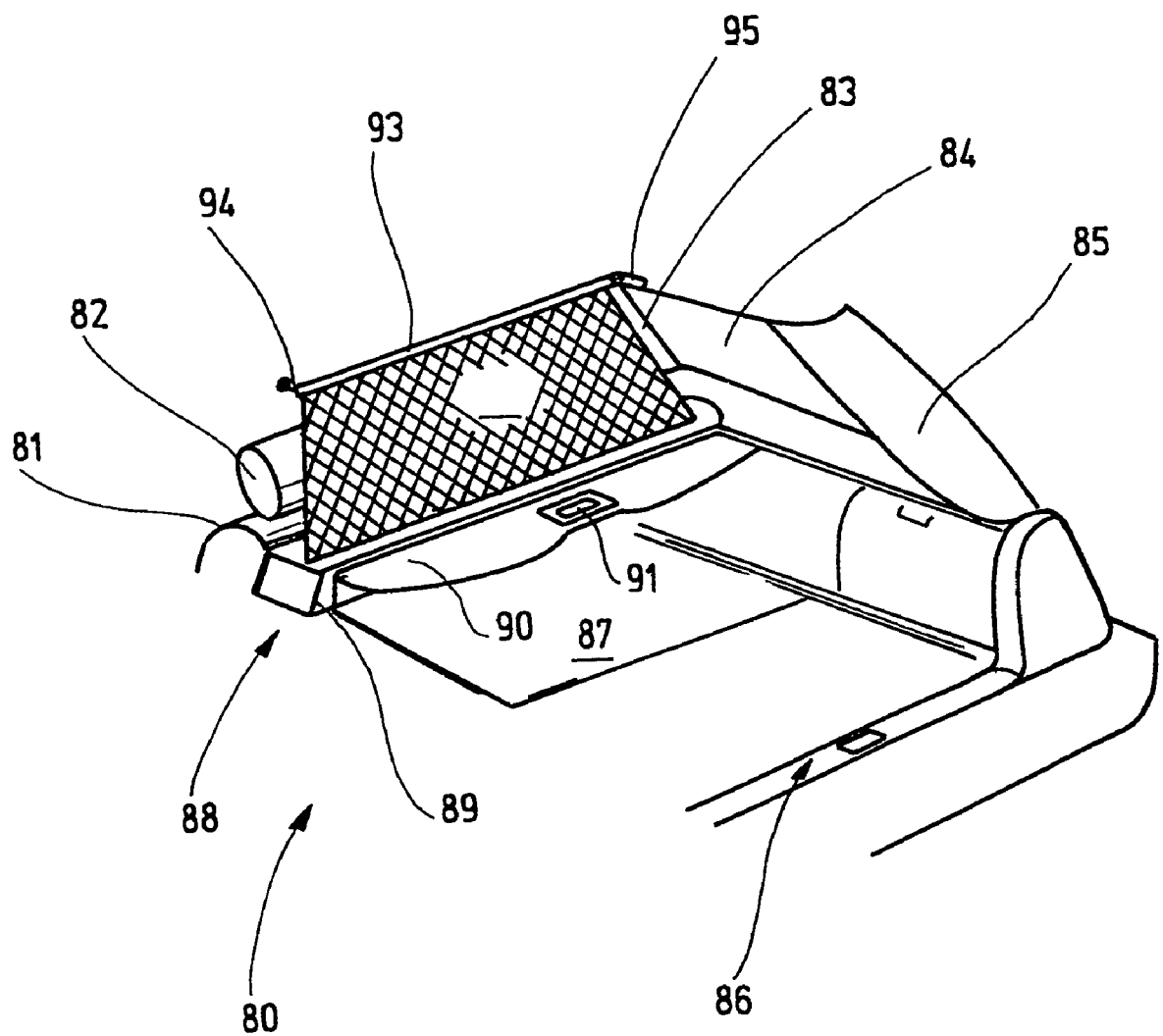
FIG. 8 is a perspective partially cutaway view of the rear of a vehicle showing the two additional embodiments of a tensioning device for a window shade arrangement according to the invention.

A partially cutaway representation of a motor car is provided in FIG. 8. Specifically, FIG. 8 shows part of the rear section 80 of a station wagon with the back rest 81 of a rear bench seat, on which several headrests 82 are arranged. FIG. 8 also shows part of the inner side of the right side wall with a C column 83, a rear side window 84 and a D column 85 that simultaneously forms part of the border of a tailgate opening 86. The tailgate itself is not illustrated. The cargo area 87 is situated underneath the rear side window 84 and extends from the rear side of the back rest 81 to the tailgate opening 86 and is limited on its upper side by the lower edge of the two side windows 84. The lower edge of the side window 84 approximately corresponds to the upper edge of the rear seat back rest 81.

A cargo area covering device 88 is provided in order to conceal the contents of the cargo area 87. The cargo area covering device 88 contains a cassette 89 as well as a cover tarpaulin 90 that can be manually extracted via a handle 91. A winding shaft similar to the winding shaft 20 is rotatably supported in the cassette 89 in order to wind up the cover tarpaulin 90. The winding shaft extends transverse to the longitudinal direction of the vehicle. A spring mechanism that corresponds to the spring mechanism 38, 39 used in the previously described embodiments is provided in order to tension the winding shaft in the wind up direction of the cover tarpaulin 90.

The cassette 89 also contains a second winding shaft for a partition screen 92. This partition screen 92 is equipped with a separate winding shaft that is configured similar to the winding shaft 20 used in the above described embodiments. The winding shaft of the partition screen 92 is tensioned in the wind up direction of the partition screen 92 by means of a spring mechanism 38, 39. The free edge of the partition screen 92 is provided with an extraction rod 93, the mushroom shaped ends 94 of which can be secured in receptacle pockets 95 that are rigidly mounted on the car body underneath the roof.

A window shade arrangement for a motor vehicle is provided that contains a housing in which a winding shaft is rotatably supported. A strip shaped shade element is fixed on the winding shaft. The cover of the window shade housing is formed by a spring housing. A coil spring for tensioning the winding shaft in the wind up direction of the strip shaped shade is seated in the spring housing. The spring housing, the spring seated therein and a coupling shaft form a preassembled unit.

The invention claimed is:

1. A motor vehicle comprising a vehicle body portion, a window supported in close relation to the vehicle body portion, a window shade assembly supported adjacent a side of said window, said window shade assembly including a shade element that is extendable for covering all or a portion of said window;
   an elongated window shade housing having a slot from which said shade element is extendable;
   a winding shaft within said shade housing on which an edge of the shade element is fixed, the winding shaft including a first positive driving element for turning the winding shaft in a direction in which the shade element is wound up on the winding shaft;
   a coil spring for tensioning the winding shaft in the direction in which the shade element is wound up on the winding shaft;
   a coil spring housing mounted externally of said window shade housing in which an end of the coil spring is anchored, said coil spring housing including first and second parts said first part including an end wall for mounting adjacent an end of said shade housing and an integrally formed cup-shaped side wall sized smaller than the end wall and the end of said shade housing extending in an axial direction away from the shade housing and wind-up shaft and defining a cavity containing said coil spring therein, said second coil spring housing part also being sized smaller than said end wall and the end of said shade housing configured to form a cover for the first part, and said coil spring housing being disposed within said vehicle body portion such that it is concealed from viewing by a user of the window shade assembly; and
   a coupling shaft having an end coupled to the coil spring, the coupling shaft including a second positive driving element for producing a positive connection with the first driving element of the winding shaft.

2. The motor vehicle according to claim 1, wherein the shade element comprises a sheet.

3. The motor vehicle according to claim 1, wherein the window shade arrangement is configured as a window shade.

4. The motor vehicle according to claim 1, wherein the winding shaft is tubular.

5. The motor vehicle according to claim 1, wherein an end of the winding shaft is provided with a bearing arrangement supporting the winding shaft.

6. The motor vehicle according to claim 5, wherein the bearing arrangement of the winding shaft consists of a journal.

7. The motor vehicle according to claim 5, wherein the bearing arrangement is accommodated in a housing of the shade arrangement.

8. The motor vehicle according to claim 5, wherein the bearing arrangement is provided in a body of the vehicle.

9. The motor vehicle according to claim 1, wherein the first positive driving element comprises an opening with a non-circular cross section that is arranged coaxial with respect to the winding shaft.

10. The motor vehicle according to claim 9, wherein the first positive driving element includes an opening that is configured complementary to a flat edge section.

11. The motor vehicle according to claim 10, wherein the opening is arranged in a bushing that is frictionally and rigidly seated in the winding shaft.

12. The motor vehicle according to claim 1, wherein the coil spring comprises a flat spiral spring.

13. The motor vehicle according to claim 1, wherein the coil spring comprises a wire spring.

14. The motor vehicle according to claim 1, wherein an outer spring end of the coil spring is anchored in the coil spring housing.

15. The motor vehicle according to claim 1, wherein an inner spring end of the coil spring is connected to the coupling shaft.

16. The motor vehicle according to claim 1, wherein the coil spring housing includes a bore in the end wall of the first part for supporting the inserted coupling shaft.

17. The motor vehicle according to claim 1, wherein the coupling shaft serves to rotatably support a corresponding end of the winding shaft.

18. The motor vehicle according to claim 1, wherein the winding shaft is rotatably supported on both ends by the coil spring and the coil spring housing.

19. The motor vehicle according to claim 1, wherein the coil spring and the coil spring housing form a preassembled unit.

20. The motor vehicle according to claim 1, wherein the coil spring has an associated removable locking device, the locking device being adapted to secure the coil spring in a wound up state.

21. The motor vehicle according to claim 20, wherein the locking device comprises a locking pin that is removably seated in a bore of the coil spring housing.

22. The motor vehicle according to claim 20, wherein the locking device comprises a profiled opening and an end section of the coupling shaft, the cross section of the end section of the coupling shaft being adapted to the profiled opening.

23. The motor vehicle according to claim 21, wherein the coupling shaft includes an opening adapted to cooperating with the locking pin.

24. The motor vehicle according to claim 1, wherein the coupling shaft is supported in the coil spring housing in an axially secured fashion.

25. The motor vehicle according to claim 1, wherein the coupling shaft is provided with an axial securing mechanism adapted for at least blocking the coupling shaft from being pulled out of the coil spring housing.

26. The motor vehicle according to claim 25, wherein the axial securing mechanism comprises an annular groove in the coupling shaft and a pin that cooperates with this annular groove and is seated in a bore of the coil spring housing.

27. The motor vehicle according to claim 1, wherein at least one lateral cover of the window shade housing is formed by the coil spring housing.

28. The motor vehicle according to claim 1, wherein the shade element comprises a knitted fabric.

29. The motor vehicle according to claim 1, wherein the shade element comprises a netting.

30. The motor vehicle according to claim 1, wherein the shade arrangement is configured as a cover for a cargo area.

31. The motor vehicle according to claim 1, wherein the shade arrangement is configured as a partition screen.

32. A motor vehicle comprising a vehicle body portion, a window supported in close relation to the vehicle body portion, a window shade assembly supported adjacent a side of said window, said window shade assembly including a shade element that is extendable for covering all or a portion of said window;
    an elongated window shade housing having a slot from which said shade element is extendable;
    a winding shaft within said shade housing on which an edge of the shade element is fixed, the winding shaft including a first positive driving element for turning the winding shaft in a direction in which the shade element is wound up on the winding shaft;
    a coil spring for tensioning the winding shaft in the direction in which the shade element is wound up on the winding shaft;
    a coil spring housing mounted on an end of said shade housing in which an end of the coil spring is anchored, and said coil spring housing containing said coil spring therein and being disposed within said vehicle body portion such that it is concealed from viewing by a user of the window shade assembly; and
    a coupling shaft having an end coupled to the coil spring within said coil spring housing, the coupling shaft including a second positive driving element for producing a positive connection with the first driving element of the winding shaft, and
    an axial securing mechanism for preventing said coupling shaft from being pulled out of said spring housing, said axial securing mechanism comprising an annular groove in said coupling shaft and a pin positionable into said spring housing from outside the spring housing for cooperation with said coupling shaft annular groove for preventing axial movement of the coupling shaft.

\* \* \* \* \*